US010376723B2

(12) United States Patent
Schultz (10) Patent No.: US 10,376,723 B2
(45) Date of Patent: Aug. 13, 2019

(54) QUICK RELEASE MOUNTING ASSEMBLY (71) Applicant: Schultz Mfg., Inc., Oregon City, OR (US)

(72) Inventor: Matthew R. Schultz, Oregon City, OR (US)

(73) Assignee: SCHULTZ MFG., INC., Oregon, OR (US)

(*) Notice: Subject to any disclaimer, the term of this patent is extended or adjusted under 35 U.S.C. 154(b) by 86 days.

(21) Appl. No.: 15/220,280

(22) Filed: Jul. 26, 2016

(65) Prior Publication Data
US 2018/0031173 A1 Feb. 1, 2018

(51) Int. Cl.
A62C 13/78 (2006.01)
F16M 13/02 (2006.01)
F16M 11/04 (2006.01)

(52) U.S. Cl.
CPC .......... *A62C 13/78* (2013.01); *F16M 11/041* (2013.01); *F16M 13/022* (2013.01)

(58) Field of Classification Search
CPC ...... A62C 13/76; A62C 13/78; F16M 11/041; F16M 13/02; F16M 13/022; Y10T 403/7075; Y10T 403/7077; Y10T 403/7079; Y10T 403/7081; Y10T 403/7083; Y10T 403/7088
USPC ............ 248/558, 218.4, 219.1, 219.2, 219.3, 248/219.4, 230.1, 230.5; 169/51; D29/125, 129, 130; D8/396; 403/376, 403/377, 378, 379.1, 379.2, 379.5
See application file for complete search history.

(56) References Cited

U.S. PATENT DOCUMENTS 4,325,529 A * 4/1982 Seebinger ............... F16B 2/08
248/218.4
4,917,338 A * 4/1990 Olson ................... F21V 21/116
248/214
5,806,215 A * 9/1998 Matthews ............ E02F 9/2841
37/452

(Continued)

OTHER PUBLICATIONS

UTV, UTV Inc 1¾" Blue Anodized Billet Clamp on Fire Extinguisher Mount & Red Extinguisher, Jun. 17, 2014 , https://www.utvinc.com/utv-inc-1-blue-anodized-billet-clamp-on-fire-extinguisher-mount/. (Year: 2014).*

(Continued)

*Primary Examiner* — Jonathan Liu
*Assistant Examiner* — Guang H Guan
(74) *Attorney, Agent, or Firm* — Alleman Hall Creasman & Tuttle LLP (57) ABSTRACT A mounting assembly having a base, a bracket body, and a key is disclosed. The base may have an attachment portion to attach the base to a structure, the attachment portion having an attachment surface extending along a first axis, and one or more base keyholes. The bracket body may have an object receiving portion to attach an object to the bracket body, and one or more bracket body keyholes. The bracket body may be non-rotatably coupled to the base so that the one or more base keyholes are aligned with the one or more bracket body keyholes with one or more pins of the key disposed therein, and the pins of the key may inhibit rotation of a handle of the key. Upon removal of the key from the mounting assembly, the base and the bracket body are configured to quickly uncouple, freeing the object from the structure.

16 Claims, 11 Drawing Sheets

(56) References Cited

U.S. PATENT DOCUMENTS

| | | | | |
|---|---|---|---|---|
| 5,906,302 | A * | 5/1999 | Spergel | A62B 25/00 224/250 |
| 5,988,727 | A * | 11/1999 | Mueller | B62J 17/04 224/448 |
| 6,488,321 | B1 * | 12/2002 | Huang | B25B 11/007 294/187 |
| 6,619,599 | B2 * | 9/2003 | Elliott | A61M 5/1415 248/125.8 |
| 7,195,038 | B2 * | 3/2007 | Friedline | F16L 3/085 138/106 |
| 7,344,116 | B2 * | 3/2008 | Ficarra | B63C 11/02 211/107 |
| D704,900 | S * | 5/2014 | Childs | B25B 11/007 D29/130 |
| 9,335,001 | B1 * | 5/2016 | Ceravolo | F16M 11/26 |
| D773,748 | S * | 12/2016 | Childs | A61M 5/1415 D29/130 |
| D782,745 | S * | 3/2017 | Childs | F16B 2/08 D29/130 |
| 2017/0268717 | A1 * | 9/2017 | Roskamp | F16M 13/02 |
| 2018/0031173 | A1 * | 2/2018 | Schultz | F16M 11/041 |

OTHER PUBLICATIONS

Maverick, Billet Fire Extinguisher Mounts, Jun. 17, 2014, http://www.maverickforums.net/forum/26-utv-inc/7261-billet-fire-extinguisher-mounts.html. (Year: 2014).*

Summit Racing Equipment, JOES Racing Products Fire Extinguisher Brackets 12822, Feb. 26, 2014, https://www.summitracing.com/parts/joe-12822/reviews/. (Year: 2014).*

\* cited by examiner

FIG. 11B

QUICK RELEASE MOUNTING ASSEMBLY

TECHNICAL FIELD

The present disclosure is directed to a quick release mounting assembly.

BACKGROUND

Mounting a retrievable object in a vehicle, watercraft, or industrial application so that it remains securely in place during rough conditions or accidents can be essential to ensure access to retrieve the object at all times. Quickly accessing the mounted object may be necessary, particularly in emergency situations. This is especially true if the mounted object is a fire extinguisher, since the fire extinguisher is commonly used after accidents and is ideally quickly accessible in the case of a fire. However, presently available object mounts are either not secure enough to keep the mounted object in place during rough conditions, or they require several steps to unstrap, unlock, or otherwise free the mounted object in order to access it.

SUMMARY

To address the above issues, a quick release mounting assembly is provided. According to a first aspect of the disclosure, a mounting assembly is provided comprising a base, a bracket body, and a key. The base has an attachment portion configured to attach the base to a structure. The attachment portion of the base has an attachment surface extending along a first axis, the base has one or more base keyholes extending along a second axis, and the bracket body is non-rotatably coupled to the base along a third axis. The bracket body has an object receiving portion configured to attach an object to the bracket body, and the bracket body has one or more bracket body keyholes along the second axis. The key has a handle and one or more pins sized to be inserted in the one or more bracket body keyholes and the one or more base keyholes. The one or more base keyholes are aligned with the one or more bracket body keyholes with the pins of the key disposed therein, and the pins of the key are configured to inhibit rotation of the handle of the key. Upon removal of the key from the mounting assembly, the base and the bracket body are configured to quickly uncouple. One potential advantage of this configuration is that it may ensure that the mounting assembly securely retains an object to a structure in rough conditions. Furthermore, by locking the handle of the key in a constant orientation to allow a user to grip the handle easily, the mounted object may be quickly and easily uncoupled from the structure to which it is mounted.

In this aspect, the second axis may be configured to be substantially orthogonal to the first axis, and the third axis may be configured to be substantially orthogonal to both the first axis and the second axis. One potential advantage of this configuration is that the bracket body and mounted object uncouple in a direction away from both the base and the structure when the key is removed from the mounting assembly, allowing the mounted object to be easily accessed.

In this aspect, the key may be further configured to be retained within the mounting assembly via detents. One potential advantage of this configuration is that the key may be securely retained within the mounting assembly during rough conditions.

In this aspect, the key may be configured to have two pins. One potential advantage of this configuration is that the two pins inhibit rotation of the key, ensuring the key is always in a constant orientation.

In this aspect, the key may be configured to have one or more non-circular pins. One potential advantage of this configuration is that the non-circular pins inhibit rotation of the key, ensuring the key is always in a constant orientation.

In this aspect, the key may be configured to be inserted into the mounting assembly keyholes from either of two sides of the mounting structure. One potential advantage of this configuration is that the key may be located on a side of the mounting assembly that is easiest for a user to access.

In this aspect, the handle of the key may be configured to have a bore, and the bore of the handle may be substantially orthogonal to the second axis. One potential advantage of this configuration is that a user can intuitively grip the bore and remove the key by and pulling directly away from the mounting assembly.

In this aspect, the handle of the key may be configured to have a hand grip with finger grooves formed within the bore. One potential advantage of this configuration is that a user can easily and securely grip the handle in the appropriate orientation and therefor easily remove the key from the mounting assembly.

In this aspect, the bracket body may be configured to have one or more recesses on a surface opposite to the object receiving portion configured to positionally retain one or more attachment rings. The one or more attachment rings may be formed separately from the bracket body and configured to secure the object to the bracket body. One potential advantage of this configuration is that the attachment rings may be manufactured easily to a desired size.

In this aspect, the one or more attachment rings may be configured to have one of a plurality of diameters, and attachment rings with different diameters may couple interchangeably to the bracket body. One potential advantage of this configuration is that objects of varying sizes can be mounted interchangeably to the mounting assembly.

In this aspect, the one or more attachment rings may be hose clamps. Potential advantages of this configuration are that hose clamps are light weight, adjustable in size, and inexpensive.

In this aspect, the bracket body may have one or more recesses on a surface adjacent to the object receiving portion configured to positionally retain one or more attachment rings. Furthermore, the one or more attachment rings may be configured to attach to the bracket body and to secure the object to the bracket body. One potential advantage of this configuration is that the one or more attachment rings with an object disposed therein, may be securely attached to the mounting assembly.

In this aspect, the one or more attachment rings may be configured to have one of a plurality of diameters, and bracket bodies having attachment rings with different diameters may couple interchangeably to the base. One potential advantage of this configuration is that objects of varying sized can be mounted interchangeably to the mounting assembly.

In this aspect, the attachment surface of the base may be a longitudinal bore, and the longitudinal bore may be configured to have a circular, rectangular, oval, or polygonal shape. One potential advantage of this configuration is that the mounting assembly may be mounted to bars, frames, supports, or the like of varying shapes.

In this aspect, the base may comprise two or more base sections formed separately. Further, a relief may formed in a longitudinal bore along seams where each of the two or more base sections contact one another, and a diameter of the longitudinal bore may be greater at the relief than at a position adjacent to the relief. One potential advantage of this configuration is that the attachment surface of the base is prevented from becoming fixed or bound to a structure to which the base is attached along the seams where the two base sections meet.

In this aspect, the attachment surface of the base may be an open surface, with a flat, curved, or geometric shape, and may be configured to mirror, at least in part, a shape of the structure to which the base is mounted. One potential advantage of this configuration is that the mounting assembly may be mounted to a variety of surfaces.

In this aspect, bases having attachment surfaces of different shapes may be configured to couple interchangeably to the bracket body. One potential advantage of this configuration is that the mounting assembly may be interchangeably mounted to different structures.

In this aspect, the attachment portion of the base may be formed separately from a mounting portion of the base, the first axis may be configured to be rotatable in a plane parallel to the second axis, and the third axis may be configured to be substantially orthogonal to both the first axis and the second axis. One potential advantage of this configuration is that the attachment portion of the base may be rotated so that the bracket body and the object attached to the bracket body may be variably positioned for easy access and storage.

In this aspect, the base, the bracket body and the key may be formed of aluminum. One potential advantage of this configuration is that the base, the bracket body and the key of the mounting assembly are both strong and lightweight.

In another aspect, a mounting assembly is provided that has a base, a bracket body, and a key. The base has an attachment portion configured to attach the base to a structure. The attachment portion of the base has an attachment surface extending along a first axis, the base has one or more base keyholes extending along a second axis, and the bracket body is non-rotatably coupled to the base along a third axis. The bracket body has an object receiving portion configured to attach an object to the bracket body, and the bracket body has one or more bracket body keyholes along the second axis. The key has a handle and one or more pins sized to be inserted in the one or more bracket body keyholes and the one or more base keyholes. The handle of the key has a hand grip with finger grooves formed within a bore of the handle. The attachment surface of the base may have one of a plurality of shapes, and bases having attachment surfaces of different shapes couple interchangeably to the bracket body. Upon removal of the key from the mounting assembly, the base and the bracket body are configured to quickly uncouple. One potential advantages of this configuration is that the mounting assembly may securely retain an object to a structure in rough conditions, and, by locking the handle of the key in a constant orientation, allow a user to easily grip the handle to remove the key from the mounting assembly, thus quickly and easily uncoupling the object from the structure to which it is mounted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

Figure 1A:
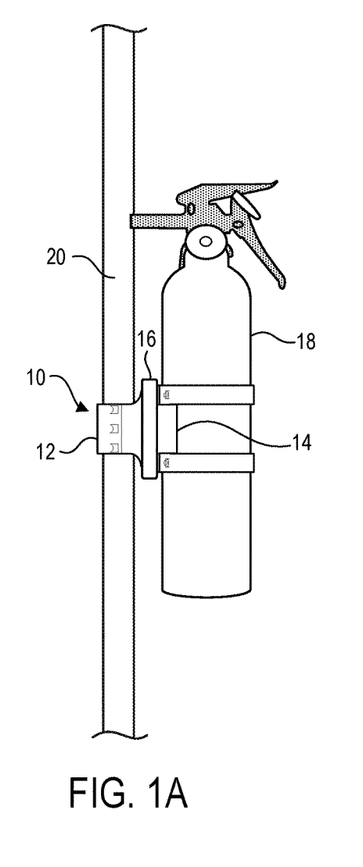
FIGS. 1A and 1B illustrate a coupled mounting assembly attaching an object to a structure and an uncoupled mounting assembly in which the object is freed from the structure when a bracket body is uncoupled from a base via removal of a key.
Figure 1B:
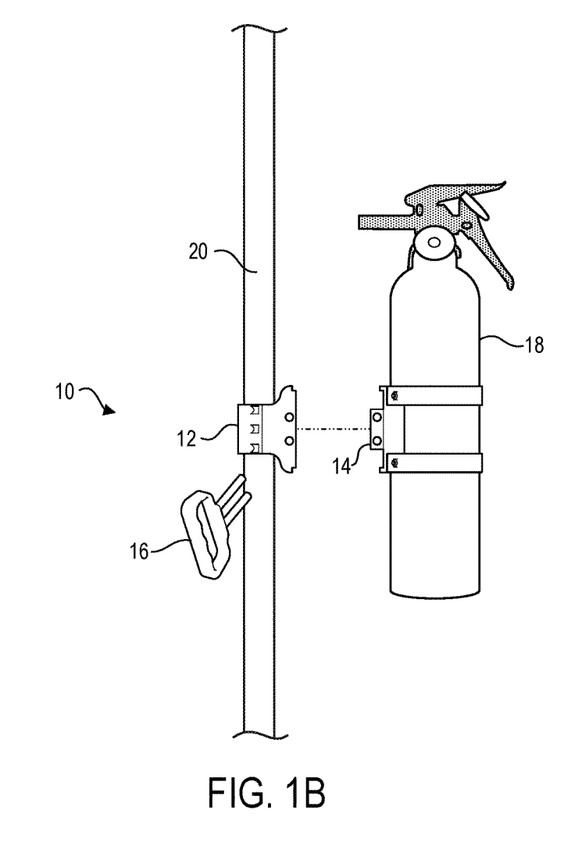

Referring initially to FIG. 1A, one embodiment of an assembled mounting assembly 10 is illustrated. The mounting assembly 10 includes at least a base 12, a bracket body 14, and a key 16 and is shown here mounting an object 18 to a structure 20. The mounting assembly 10 is configured to securely mount the object 18 (shown here as a fire extinguisher) to the structure 20 (shown here as a bar). The structure 20 is preferably a fixed support, such as a frame, located in a vehicle, watercraft, or industrial application. However, the mounting assembly 10 may mount the object 18 to a fixed structure 20 anywhere in which rough conditions may be experienced by the mounted object 18. As shown in FIG. 1B, the mounting assembly 10 is further configured to allow the bracket body 14 to be quickly uncoupled from the base 12. Specifically, by removal of the key 16 from the mounting assembly 10, the bracket body 14 with the object 18 attached may be immediately uncoupled from the base 12, thus freeing the object 18 from the structure 20.

Figure 2:
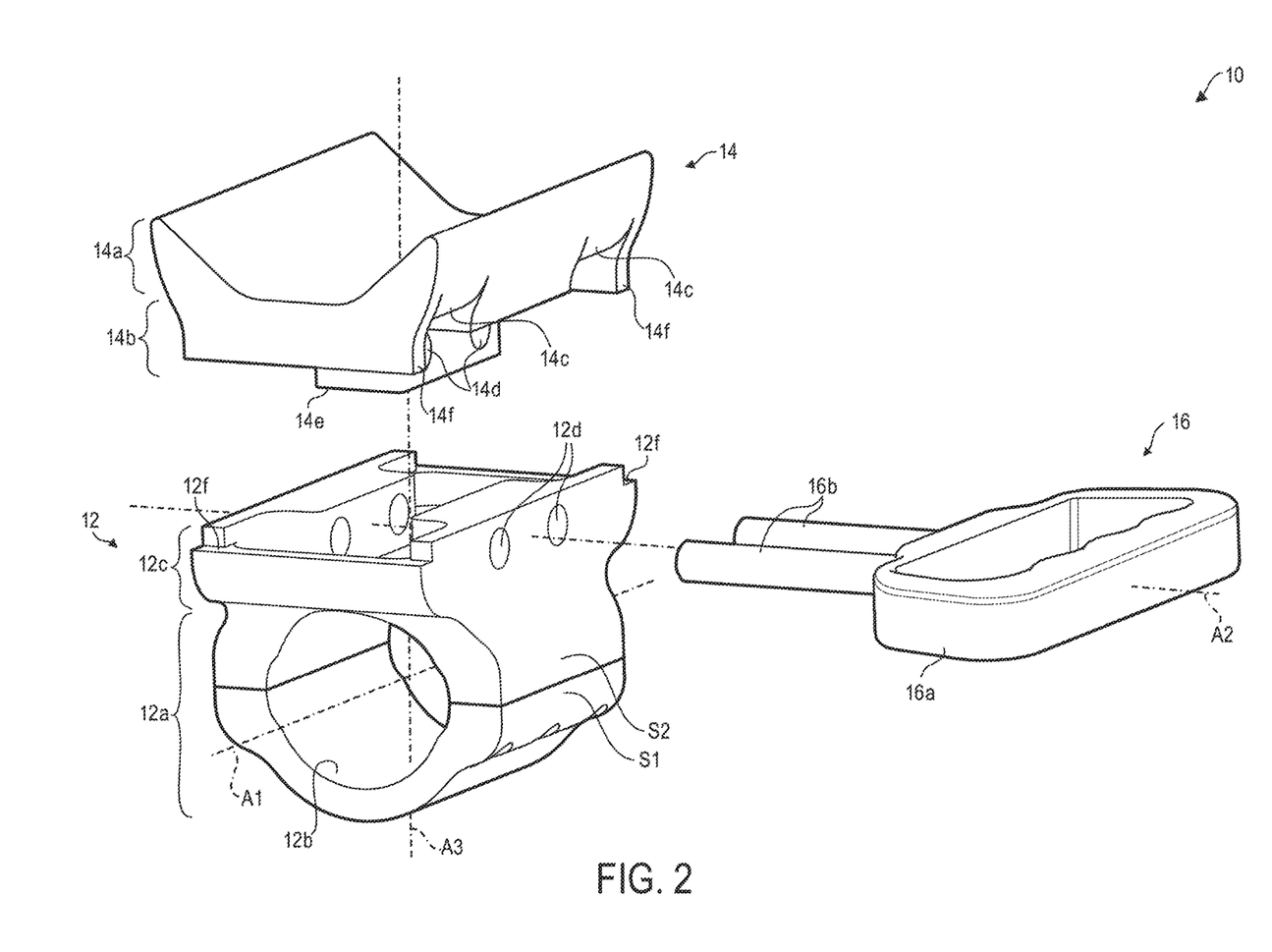
FIG. 2 illustrates a perspective view of an uncoupled mounting assembly provided according to a first embodiment of the present disclosure.

FIG. 2 shows an uncoupled mounting assembly 10 according to a first embodiment. The base 12 of the mounting assembly 10 has an attachment portion 12a configured to attach the base 12 to the structure 20. The attachment portion 12a has an attachment surface 12b extending along a first axis A1. In this embodiment, the attachment surface 12b of the base 12 is a longitudinal bore having a substantially cylindrical shape. The attachment surface 12b is configured, at least in part, to mirror a shape of the structure 20 to which the base 12 is attached. To allow the attachment surface 12b to attach to the structure 20, the base 12 may comprise two or more base sections S1 and S2 formed separately, shown here as two base sections S1 and S2. The two base sections S1 and S2 may be placed on opposite sides of the structure 20 and secured together with, for example, one or more screws. By securing the two base sections S1 and S2, with the structure 20 disposed between the two base sections S1 and S2, the base 12 may be secured to the structure 20. However, the present disclosure is not limited to mounting assemblies 10 with bases 12 comprising two base sections S1 and S2, the base 12 may instead comprise more than two base sections. Alternatively, the base 12 may comprise a single base section configured to be secured directly to the structure 20 with, for example, one or more screws.

Figure 3A:
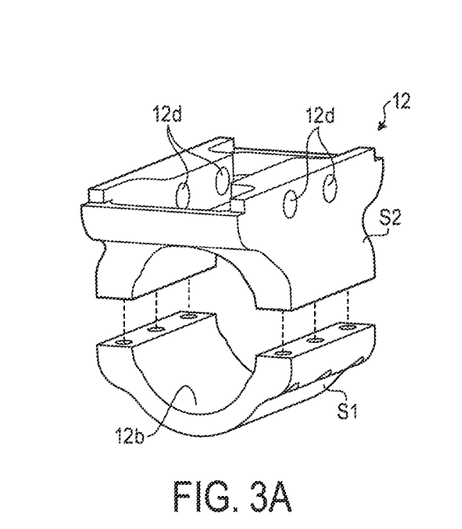
FIGS. 3A-3F show perspective views and views along a first axis of three base variations provided according to the first embodiment of the present disclosure.
Figure 3B:
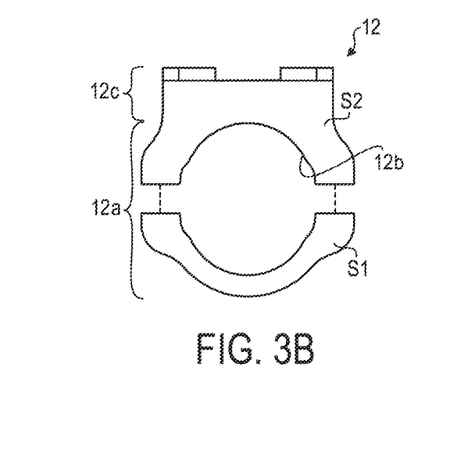
Figure 3C:
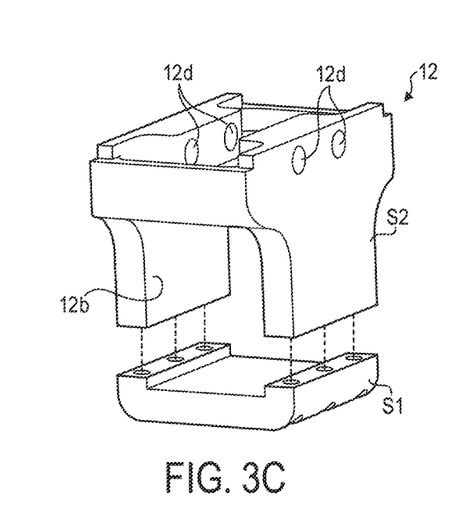
Figure 3D:
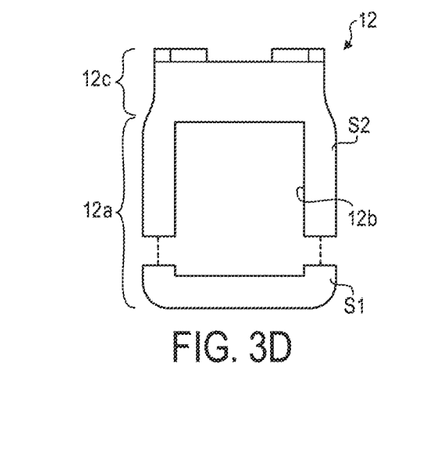
Figure 3E:
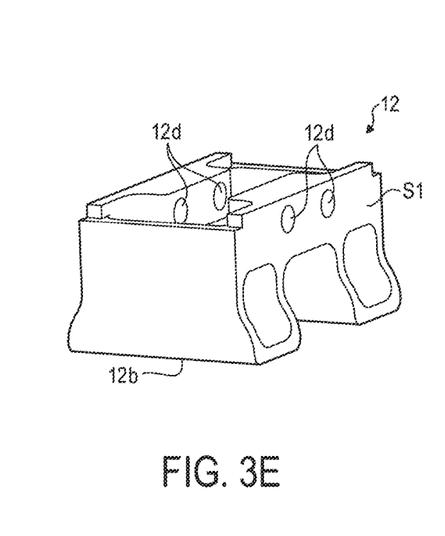
Figure 3F:
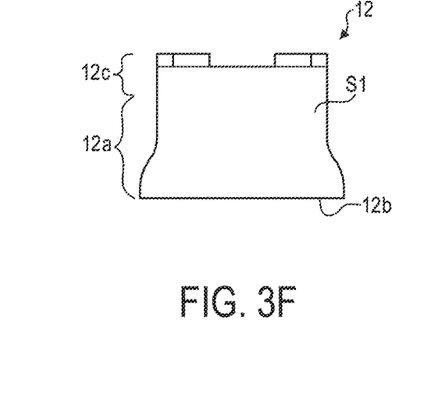

Referring now to FIGS. 3A-3F, additional configurations of the base 12 of the mounting assembly 10 are described. The attachment surface 12b of the base 12 may be any shape, and is therefore not limited to being configured as a longitudinal bore having a circular shape. As shown in FIG. 3A-3D, when the attachment surface 12b is a longitudinal bore, the attachment surface 12b may be configured to have a circular, rectangular, oval, or polygonal shape. The size of the longitudinal bore may be any of a plurality of diameters or widths, depending on the size of the structure 20 to which the base 12 is mounted, allowing the base 12 to attach to structures 20 having a plurality of sizes. This configuration may allow the mounting assembly 10 to be mounted to bars, frames, supports, or other structures 20 having varying shapes. Furthermore, as shown in FIGS. 3E-F, instead of the attachment surface 12b being a longitudinal bore, the attachment surface 12b of the base 12 may have one of a plurality of shapes. In some examples, the attachment surface 12b may be an open surface, and it may have either a flat, curved, or geometric shape configured to mirror, at least in part, a shape of the structure 20 to which the base 12 is mounted. Furthermore, bases 12 having attachment surfaces 12b of different shapes may couple interchangeably to the bracket body 14. The versatile design and interchangeable nature of the base 12 of the mounting assembly 10, ensures that that the mounting assembly 10 may be mounted to a variety of structures or surfaces.

Figure 4A:
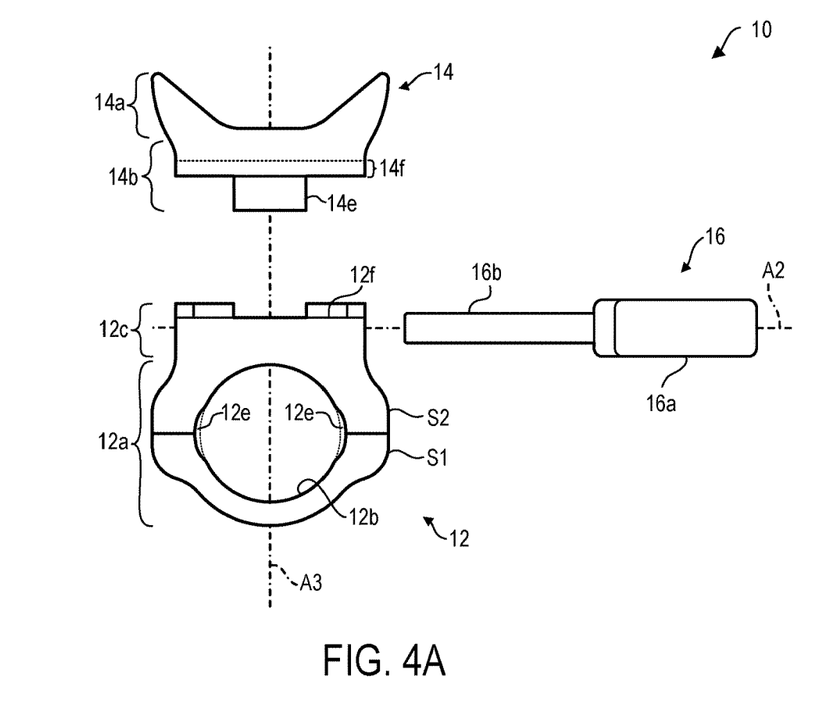
FIGS. 4A and 4B show an uncoupled and coupled mounting assembly according to the first embodiment of the present disclosure, as viewed along a first axis.
Figure 4B:
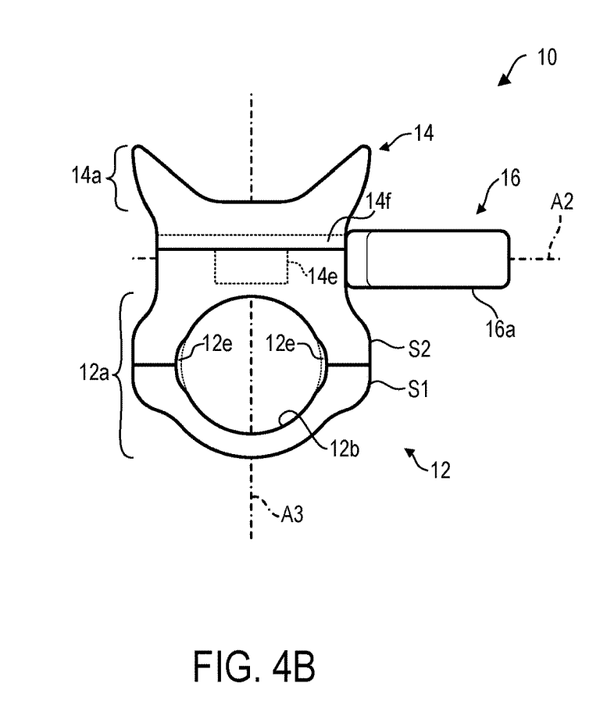

FIGS. 4A and 4B show the mounting assembly 10 according to the first embodiment, as viewed from a direction parallel to the first axis A1. As shown in FIG. 4A, the attachment surface 12b of this embodiment is preferentially a longitudinal bore. In this configuration, a relief 12e may be formed in the longitudinal bore along seams where each of the two or more base sections S1 and S2 contact one another. In contrast to the rest of the attachment surface 12b, which is configured to have a diameter substantially equal to a diameter of the structure 20 to which the base 12 is attached, the relief 12e may be configured with a diameter larger than a diameter of the structure 20. Specifically, a diameter of the longitudinal bore in the depicted embodiment is greater at the relief 12e than at a position adjacent to the relief 12e. Dashed lines indicate the relative diameter of the rest of the attachment surface 12b along the portion of the longitudinal bore where the relief 12e is formed. The relief 12e in the attachment surface 12b has the advantage of preventing the attachment surface 12b of the base 12 from becoming fixed or bound to the structure 20 along the seam where the two base sections S1 and S2 meet. This configuration prevents the base 12 from damaging a surface of the structure 20, and ensures that the base 12 may be easily removed from the structure 20 even after extended use.

The base 12 is further configured to have a base mounting portion 12c on a side of the base 12 opposite to the attachment portion 12a. The base mounting portion 12c is configured to mount the base 12 to the bracket body 14. As shown in FIG. 2, according to the first embodiment, the base mounting portion 12c has one or more base keyholes 12d extending along a second axis A2, the second axis A2 being substantially orthogonal to the first axis A1. The one or more base keyholes 12d are configured to accept one or more pins 16b of the key 16 therein. This configuration ensures that, when the pins 16b of the key 16 are either inserted or removed from the one or more base keyholes 12d, an applied force is exerted in a direction substantially orthogonal to the structure 20 to which the base 12 is attached.

The bracket body 14 has an object receiving portion 14a and a bracket body mounting portion 14b. The bracket body mounting portion 14b is configured to mount the bracket body 14 to the base 12 via coupling of the base mounting portion 12c with a bracket body mounting portion 14b. As shown in FIGS. 4A and 4B, the base 12 is configured to receive a protuberance 14e of the bracket body mounting portion 14b. The protuberance 14e of the bracket body mounting portion 14b is inserted into the base mounting portion 12c so that the bracket body 14 is non-rotatably coupled to the base 12 along a third axis A3. Additionally, in a preferred embodiment, the third axis may be substantially orthogonal to both the first axis A1 and the second axis A2. This configuration allows the bracket body 14 and mounted object 18 to uncouple in a direction away from both the base 12 and the structure 20 when the key 16 is removed from the mounting assembly 10, allowing the mounted object 18 to be easily accessed.

However, the present disclosure is not limited to mounting assemblies 10 having a protuberance formed on the bracket body 14. Instead, the protuberance may instead be formed on the base 12 and configured to interlock with the bracket body mounting portion 14b. Alternatively, the base mounting portion 12c and the bracket body mounting portion 14b may both have a protuberance configured to interlock with the bracket body mounting portion 14b and the base mounting portion 12c, respectively.

Figure 5A:
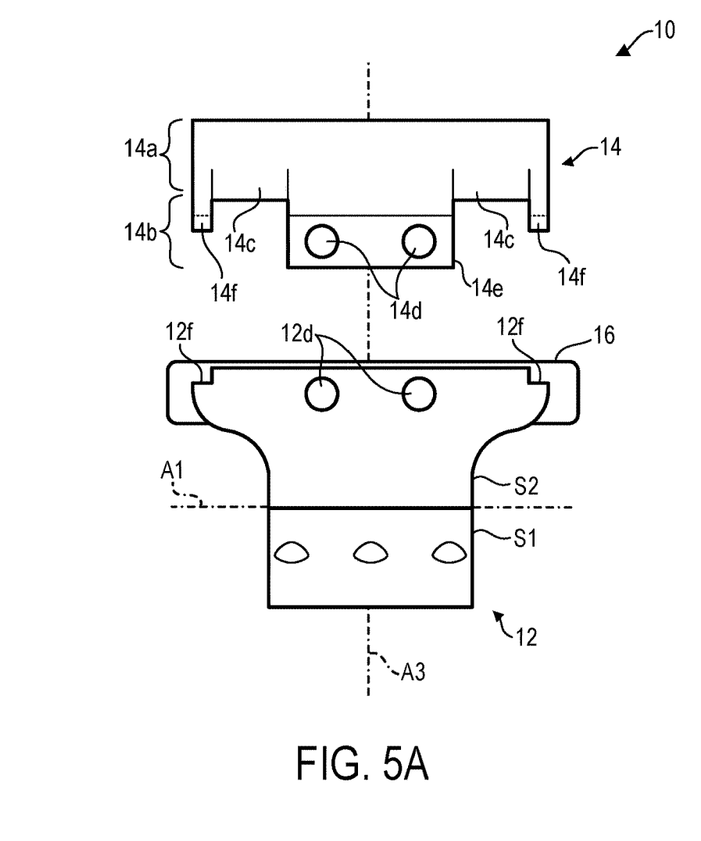
FIGS. 5A and 5B show the uncoupled and coupled mounting assembly of FIGS. 4A and 4B, as viewed along a second axis.
Figure 5B:
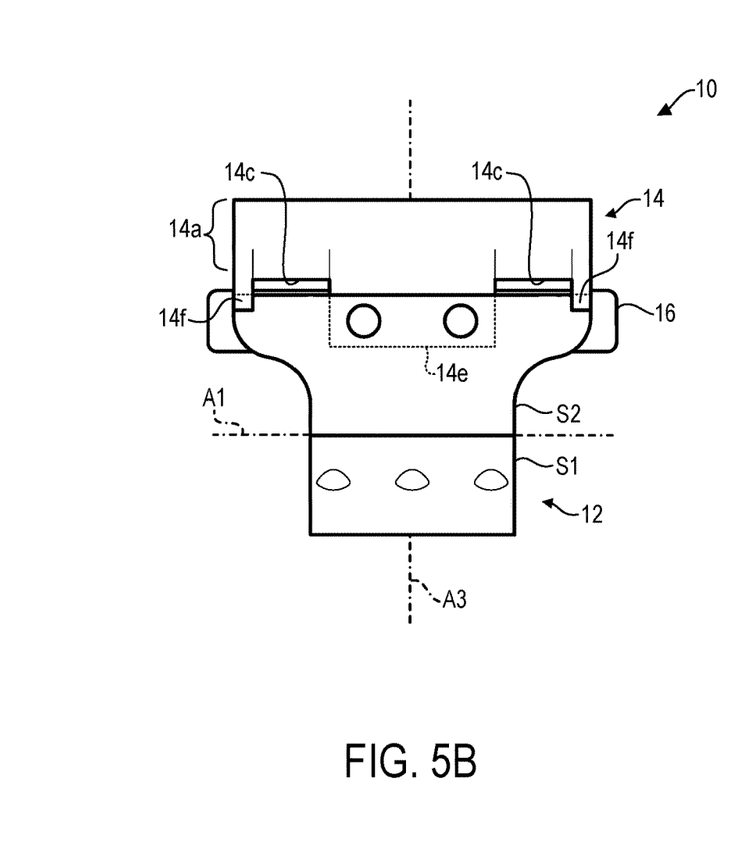

FIGS. 5A and 5B illustrate the mounting assembly 10 as viewed from a direction parallel to the second axis A2. As shown in FIGS. 5A and 5B, the bracket body mounting portion 14b of the bracket body 14 has one or more bracket body keyholes 14d along the second axis A2, the one or more bracket body keyholes 14d being configured to accept the one or more pins 16b of the key 16 therein. Furthermore, when the bracket body 14 is mounted to the base 12, the one or more base keyholes 12d and the one or more bracket body keyholes 14*d* are aligned to allow the one or more pins 16*b* of the key 16 to be inserted therethrough.

The bracket body mounting portion 14*b* may be configured to have lips 14*f* extending along edges of the bracket body mounting portion 14*b*, where the edges of the bracket body mounting portion 14*b* are the widest point of the bracket body mounting portion 14*b* in the first axis A1. The heights of the lips 14*f* of the bracket body 14 are shown with dashed lines. As shown in FIGS. 5A and 5B, the lips 14*f* of the bracket body mounting portion 14*b* are configured to interlock with notches 12*f* of the base mounting portion 12*c* when the mounting assembly 10 is assembled. The notches 12*f* of the base mounting portion 12*c* are formed along edges of the base mounting portion 12*c*, where the edges of the base mounting portion 12*c* are the widest points of the base mounting portion 12*c* in the first axis A1. By interlocking the lips 14*f* of the bracket body 14 with the notches 12*f* of the base 12, the base 12 cannot move relative to the bracket body 14 along the first axis A1 while the bracket body 14 is mounted to the base 12. Furthermore, by interlocking the protuberance 14*e* of the bracket body 14 with the base mounting portion 12*c*, the base 12 cannot move relative to the bracket body 14 along the second axis A2 while the bracket body 14 is mounted to the base 12. This configuration ensures that the one or more base keyholes 12*d* remain precisely aligned with the one or more bracket body keyholes 14*d* while the bracket body 14 is mounted to the base 12, allowing the pins 16*b* of the key 16 to be easily inserted therethrough when the mounting assembly 10 is assembled.

However, the present disclosure is not limited to mounting assemblies 10 having lips formed on the bracket body 14. Instead, the lips may be formed on the base 12 and configured to interlock with notches formed on the bracket body mounting portion 14*b*. Alternatively, the base mounting portion 12*c* and the bracket body mounting portion 14*b* may both have one or more lips configured to interlock with one or more notches formed on the bracket body mounting portion 14*b* and the base mounting portion 12*c*, respectively. Additionally, the mounting assembly 10 may be configured without either lips or notches.

The object receiving portion 14*a* is preferentially formed on a side of the bracket body 14 opposite to the bracket body mounting portion 14*b* and configured to attach an object 18 to the bracket body 14. The bracket body 14 may have one or more recesses 14*c* on a surface opposite to the object receiving portion 14*a*, the one or more recesses 14*c* being configured to positionally retain one or more attachment rings 22, where positionally retaining the one or more attachment rings 22 restricts freedom of movement of the one or more attachment rings 22 in the first axis A1 and the second axis A2. The one or more recesses 14*c* are preferentially configured to extend along the second axis A2, and a terminal edge of each of the one or more recesses 14*c* along the second axis A2 is preferentially rounded toward the object receiving portion 14*a* so that the terminal edges of each of the one or more recesses 14*c* are closer to the object receiving portion 14*a* than a center point of each of the one or more recesses 14*c* is to the object receiving portion 14*a*. This configuration allows the one or more attachment rings 22 to fit securely around the bracket body 14. According to the first embodiment, the one or more attachment rings 22 are formed separately from the bracket body 14 and configured to secure the object 18 to the bracket body 14.

Figure 6:
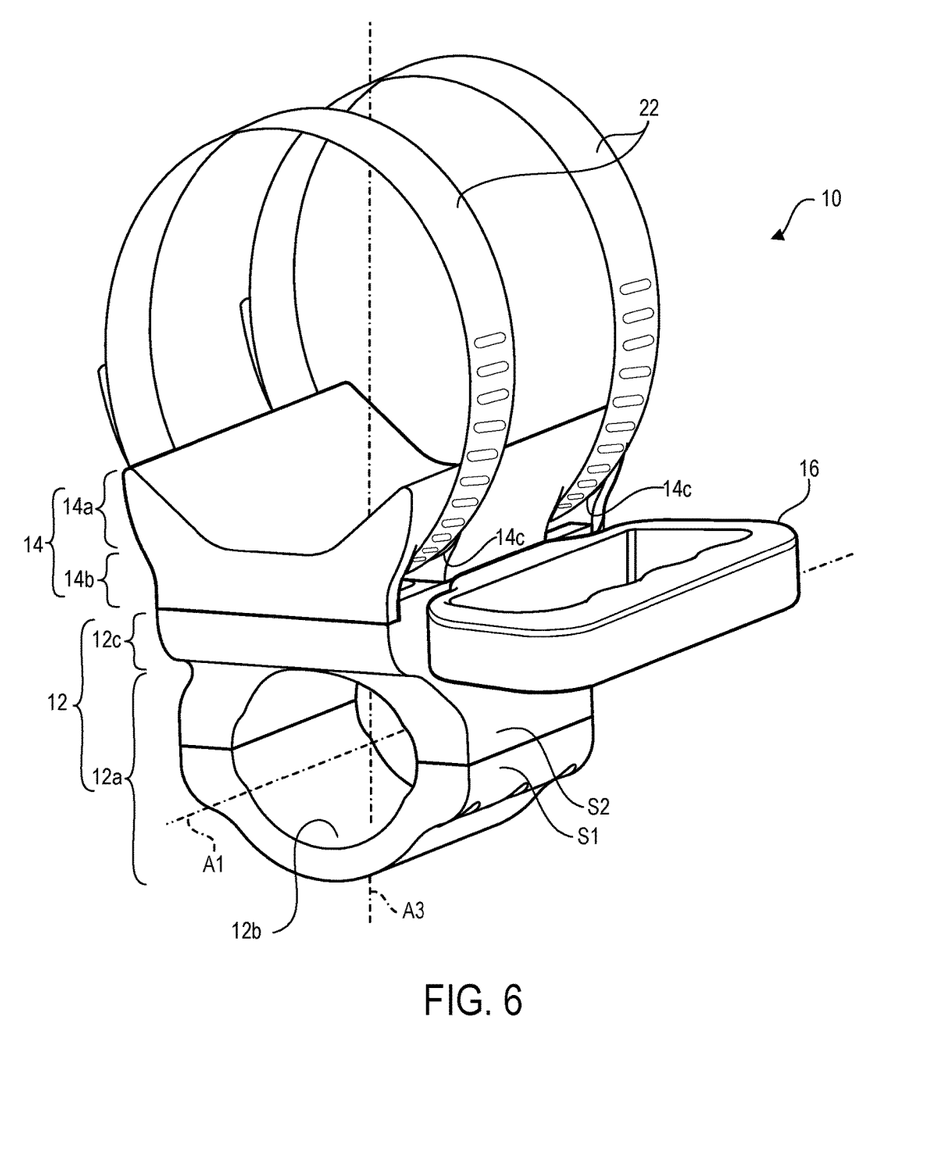
FIG. 6 illustrates a perspective view of a coupled mounting assembly with hose clamps as attachment rings, provided according to the first embodiment of the present disclosure.

As shown in FIG. 6, the one or more attachment rings 22 of the first embodiment are preferentially hose clamps, which it will be understood are configured to be elongated or compressed in a circumferential direction to unclamp or clamp a cylindrical object. However, any suitably rigid attachment rings may be used, such as, for example, nylon straps. Hose clamps are desirable for use as attachment rings since they are compact, lightweight, adjustable, and inexpensive. Since hose clamps are adjustable in diameter, the one or more attachment rings 22 may have one of a plurality of diameters, and may be configured to attach objects 18 of a variety of sizes to the bracket body 14. Thus, the attachment rings 22 may be selected to have a desired size and objects 18 of varying sizes may be mounted interchangeably to the mounting assembly 10.

Figure 7A:
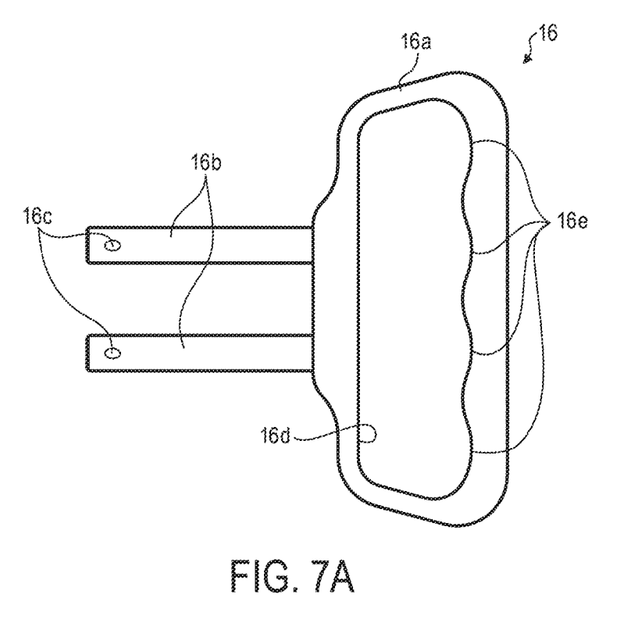
FIGS. 7A-7C illustrate a key of the mounting assembly provided according to one embodiment of the present disclosure.
Figure 7B:
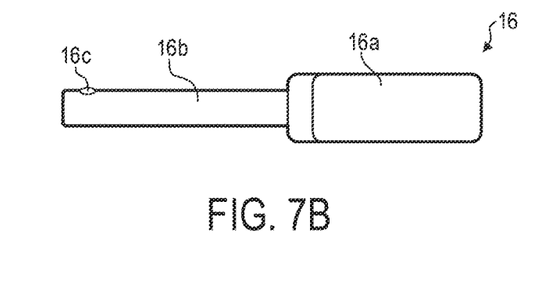
Figure 7C:
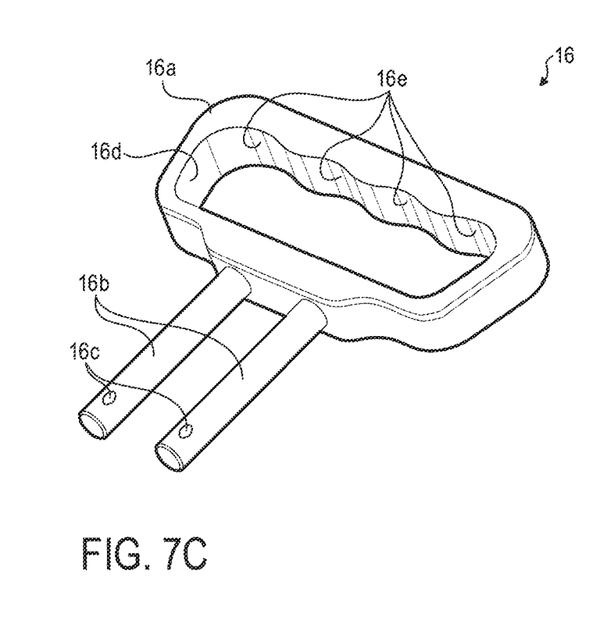

Referring now to FIGS. 7A-7C, the key 16 of the mounting assembly 10 is described in more detail. The key 16 is configured to have a handle 16*a* and one or more pins 16*b*. The pins 16*b* are sized to be inserted in the one or more bracket body keyholes 14*d* and the one or more base keyholes 12*d*. In the assembled mounting assembly 10 the one or more base keyholes 12*d* are aligned with the one or more bracket body keyholes 14*d* with the pins 16*b* of the key 16 disposed therein. Furthermore, the pins 16*b* of the key 16 are configured to inhibit rotation of the handle 16*a* of the key 16. Inhibiting rotation of the key 16 ensures that the key will remain in a constant orientation even if rough conditions are experienced by the mounting assembly 10, which may ensure that the key 16 may be easily grasped by a user. In a preferred embodiment, the key 16 has two pins 16*b*, which inhibits the rotation of the handle. However, the pins 16*b* of the key 16 may inhibit rotation of the handle 16*a* in any suitable manner. For example, the key 16 may have one or more non-circular pins 16*b*. In any of the embodiments described herein, the mounting assembly is preferentially configured so that the key 16 may be inserted into the one or more base keyholes 12*d* and the one or more bracket body keyholes 14*d* from either of two sides of the mounting assembly 10. By allowing the key 16 to be inserted from either side of the mounting assembly 10, the handle 16*a* of the key 15 may be preferentially located on a side of the mounting assembly 10 that is easiest for a user to access.

Furthermore, the bracket body 14 cannot move relative to the base 12 along either the first axis A1 or the third axis A3 while the pins 16*b* of the key 16 are disposed within the one or more base keyholes 12*d* and the one or more bracket body keyholes 14*d*. Thus, this configuration has the advantage of securing the bracket body 14 to the base 12 in the assembled mounting assembly 10. As shown in FIG. 2, upon removal of the key 16 from the mounting assembly 10, the base 12 and the bracket body 14 are configured to quickly uncouple.

In any of the embodiments described herein, the key 16 may be configured to be retained within the mounting assembly 10 via detents 16*c*. The detents 16*c* ensure that the key 16 may be securely retained within the mounting assembly 10, even if the mounting assembly 10 experiences rough conditions. In the example illustrated in FIGS. 7A-7C, the detents 16*c* are shown on the pins 16*b* of the key 16. However, the present disclosure is not limited to mounting assemblies 10 in which the detents 16*c* are located on the pins 16*b* of the key 16, and the detents 16*c* may instead be in either the one or more base keyholes 12*d* or the one or more bracket body keyholes 14*d*. Alternatively, the mounting assembly 10 may be configured without detents 16*c*, and the key 16 may be configured to be retained within the mounting assembly 10 via friction.

As shown in FIGS. 7A and 7C, the handle 16*a* of the key 16 has a bore 16*d*, and the handle 16*a* of the key 16 has a hand grip with finger grooves 16*e* formed within the bore 16*d*. This hand grip with finger grooves 16*e* allows a user to easily and securely grip the handle 16*a* of the key 16, thus facilitating an easy removal of the key 16 from the mounting assembly 10. Additionally, when the key 16 is inserted into the mounting assembly 10, the bore 16d of the handle 16a is substantially orthogonal to the second axis A2. By arranging the key 16 in this manner, a user can intuitively grip the bore 16d of the key 16 in the appropriate orientation and remove the key 16 by and pulling directly away from the mounting assembly 10.

In any of the embodiments described herein, the base 12, the bracket body 14 and the key 16 of the mounting assembly 10 are preferentially formed of aluminum, or an aluminum alloy. Being both strong and lightweight, aluminum is an advantageous material for mounting assemblies 10 mounted in, for example, a racecar, where weight and durability are both concerns. However, mounting assemblies 10 of any of the embodiments described herein may be formed of any sufficiently durable material, such as steel or the like.

Figure 8:
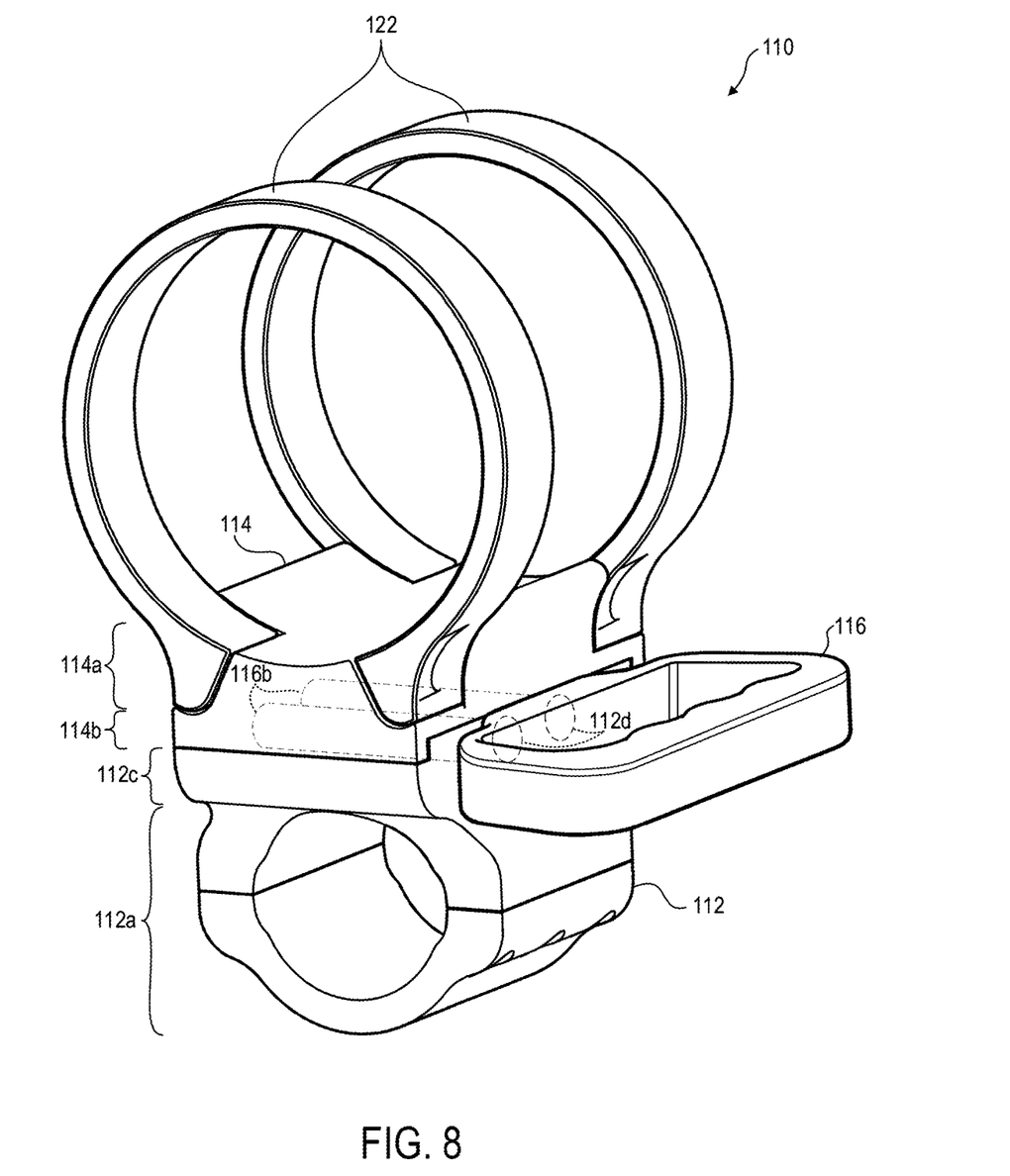
FIG. 8 illustrates a perspective view of a coupled mounting assembly with attachment rings, provided according to a second embodiment of the present disclosure.

Referring now to FIG. 8, a mounting assembly 110 is provided according to a second embodiment of the present disclosure. Since the mounting assembly 110 is generally similar to that of the first embodiment, with the exception of the bracket body 114 and the attachment rings 122, detailed description thereof is condensed here for the sake of brevity. It is to be noted that like parts are designated by like reference numerals throughout the detailed description and the accompanying drawings.

Figure 9A:
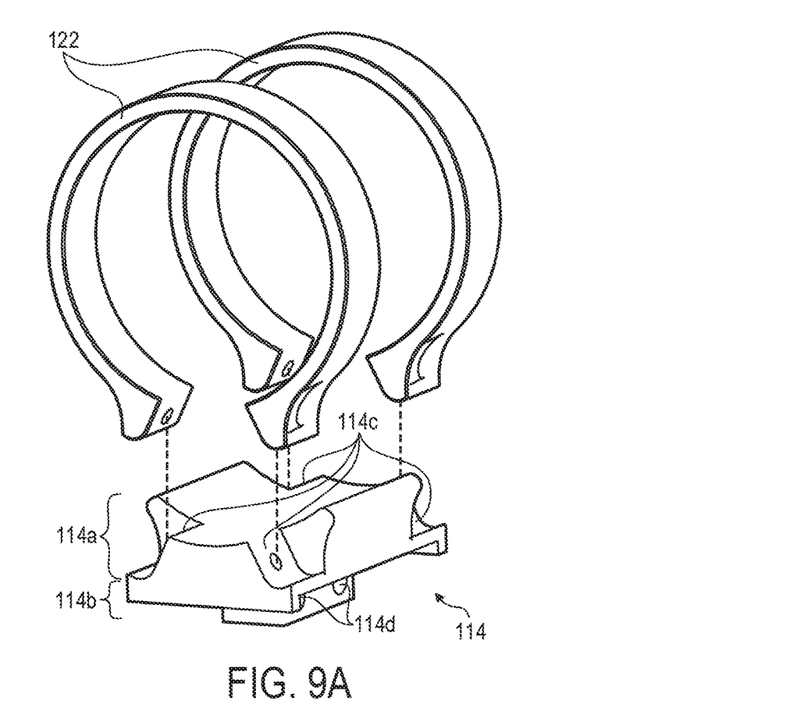
FIGS. 9A-9C show an unassembled perspective view, an assembled view along the second axis, and an assembled view along the first axis, respectively, of the bracket body and attachment rings provided according to the second embodiment of the present disclosure.
Figure 9B:
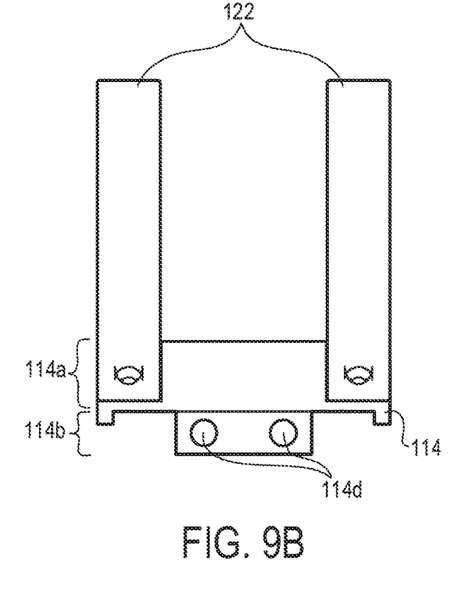
Figure 9C:
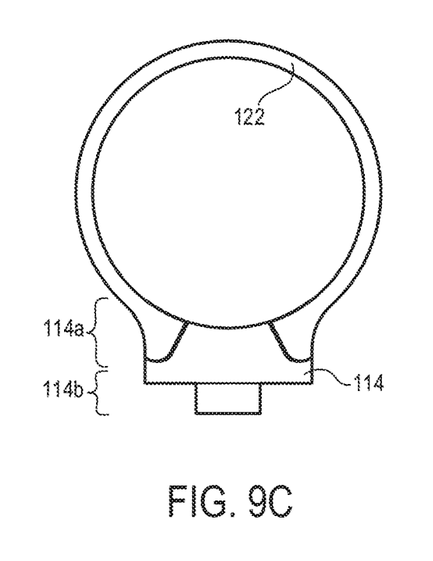

As shown in FIG. 8, the mounting assembly 110 according to the second embodiment comprises a base 112 that includes attachment portion 112a and base mounting portion 112c, a bracket body 114, and a key 116. Similar to the previous embodiment, the bracket body 114 has an object receiving portion 114a and a bracket body mounting portion 114b, and the bracket body mounting portion 114b is configured to mount the bracket body 114 to the base 112. Furthermore, when the mounting assembly 110 is assembled, one or more base keyholes 112d are configured to be aligned with one or more bracket body keyholes 114d with pins 116b of the key 116 disposed therein. As shown in FIG. 9A, the bracket body 114 according to the second embodiment has one or more recesses 114c on a surface adjacent to the object receiving portion 114a configured to positionally retain one or more attachment rings 122, where positionally retaining the one or more attachment rings 122 restricts freedom of movement of the one or more attachment rings 122 in the first axis A1 and the second axis A2. The location of the one or more recesses 114c of the second embodiment is in contrast to the location of the one or more recesses 14c of the first embodiment, which preferentially locates the one or more recesses are on a surface opposite to an object receiving portion. The one or more attachment rings 122 are preferentially formed separately from the bracket body 114 and configured to attach to the bracket body 114 with, for example, one or more screws. Example locations for one or more screws to be inserted into the one or more attachment rings 122 and the one or more recesses 114c of the bracket body 114, shown here as four screw locations, are indicated in FIG. 9A with dashed lines. As shown in FIGS. 9B and 9C, the one or more attachment rings 122 are configured to attach to the bracket body 114. Thus, when an object 118 is disposed within the one or more attachment rings 122, the one or more attachment rings 122 are further configured to secure the object 118 to the bracket body 114. One advantage of this configuration is that custom fabricated attachment rings 122, configured to attach to an object 118 having a specific or irregular shape, may couple directly to the bracket body 114, thus allowing the irregularly shaped object 118 to be securely mounted to the mounting assembly 110. Additionally, the one or more attachment rings 122 may have one of a plurality of diameters, and bracket bodies 114 having attachment rings 122 with different diameters couple interchangeably to the base 112. This configuration allows objects 118 of varying sized to be mounted interchangeably to the mounting assembly 110. For all other aspects of this embodiment of the mounting assembly 110, the configuration reflects the primary embodiment of the present disclosure.

Figure 10A:
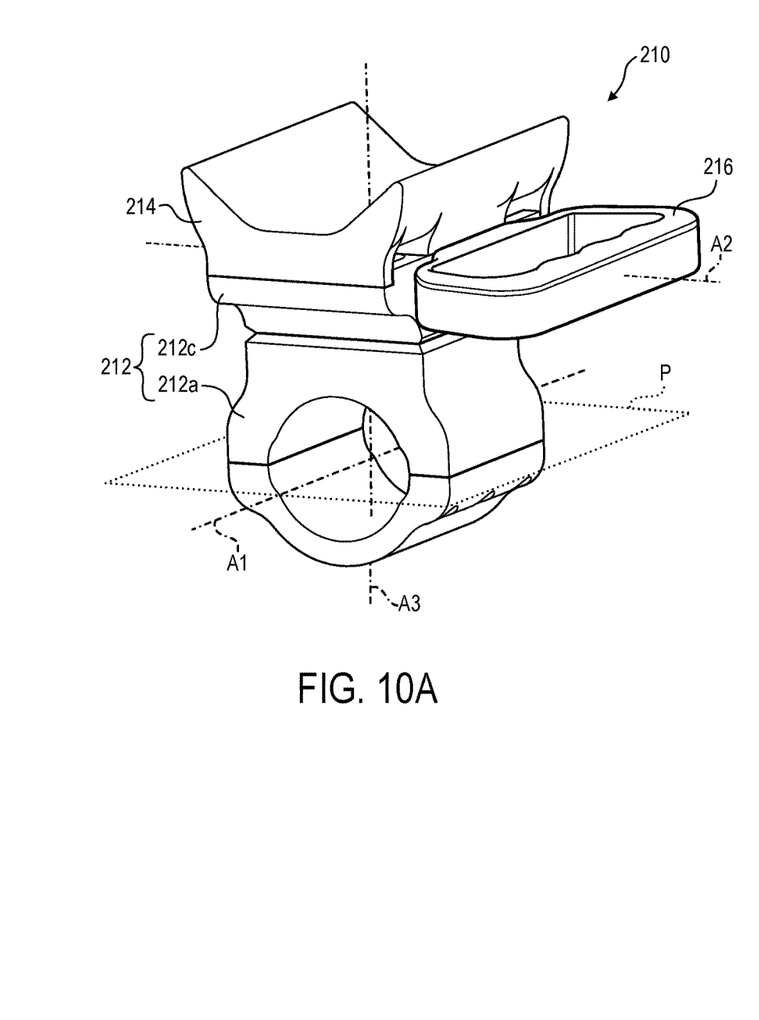
FIGS. 10A and 10B show perspective views of a coupled mounting assembly having a rotatable base, provided according to a third embodiment of the present disclosure.
Figure 10B:
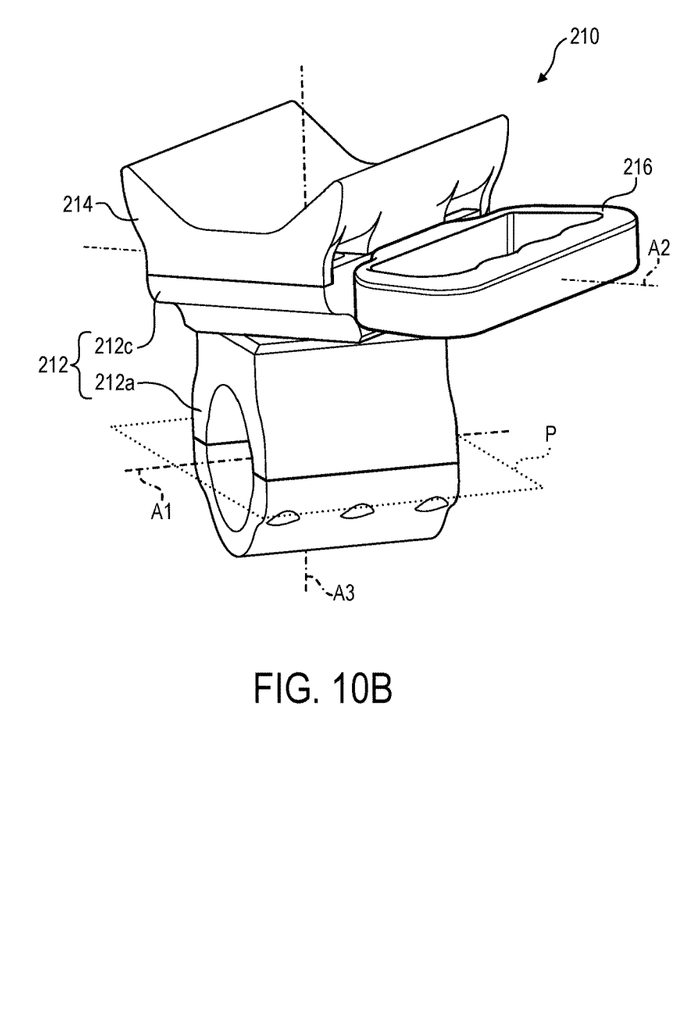

Turning now to FIGS. 10A and 10B, a mounting assembly 210 is provided according to a third embodiment of the present disclosure. Since the mounting assembly 210 is generally similar to that of the first embodiment, with the exception of the base 212, detailed description thereof is condensed here for the sake of brevity. It is to be noted that like parts are designated by like reference numerals throughout the detailed description and the accompanying drawings.

As shown in FIG. 10A, the mounting assembly 210 according to the third embodiment comprises a base 212, a bracket body 214, and a key 216. Similar to the previous embodiments, the base 212 according to the second embodiment has an attachment portion 212a and a base mounting portion 212c, and the base mounting portion 212c is configured to mount the base 212 to the bracket body 214. As shown in FIG. 10B, the attachment portion 212a of the base 212 is configured to be rotatable relative to the base mounting portion 212c around the third axis A3. Specifically, the first axis A1 is rotatable in a plane P parallel to the second axis A2, and the third axis A3 is substantially orthogonal to both the first axis A1 and the second axis A2. Accordingly, the first axis A1 may be rotated in the plane P so that the first axis A1 is either parallel or at an angle relative to the second axis A2, instead of the first axis A1 being preferentially orthogonal to the second axis A2, as seen with the first embodiment.

Figure 11A:
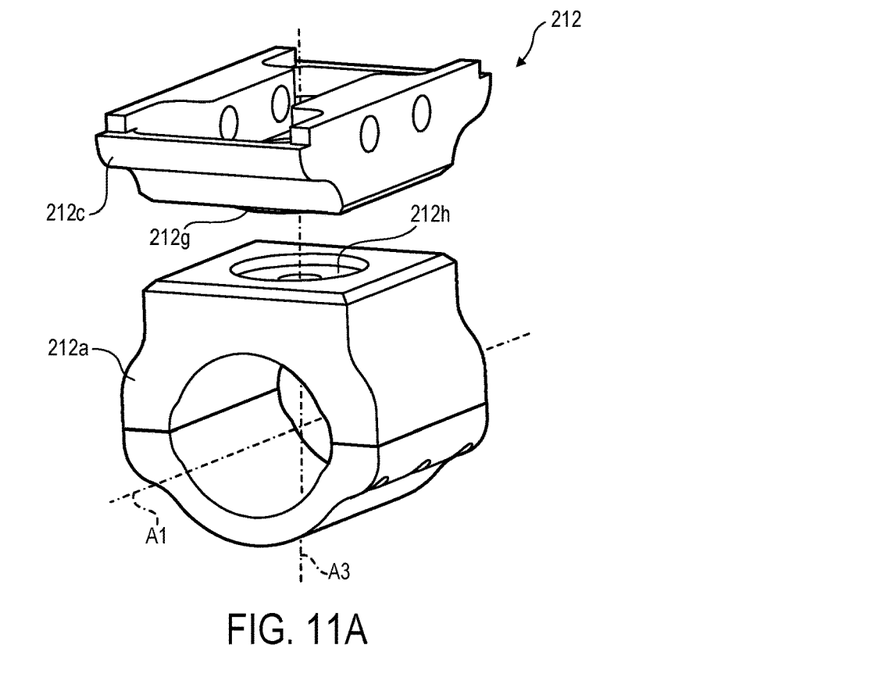
FIGS. 11A and 11B show perspective views of an unassembled rotatable base from two different viewpoints, provided according to a third embodiment of the present disclosure.
Figure 11B:
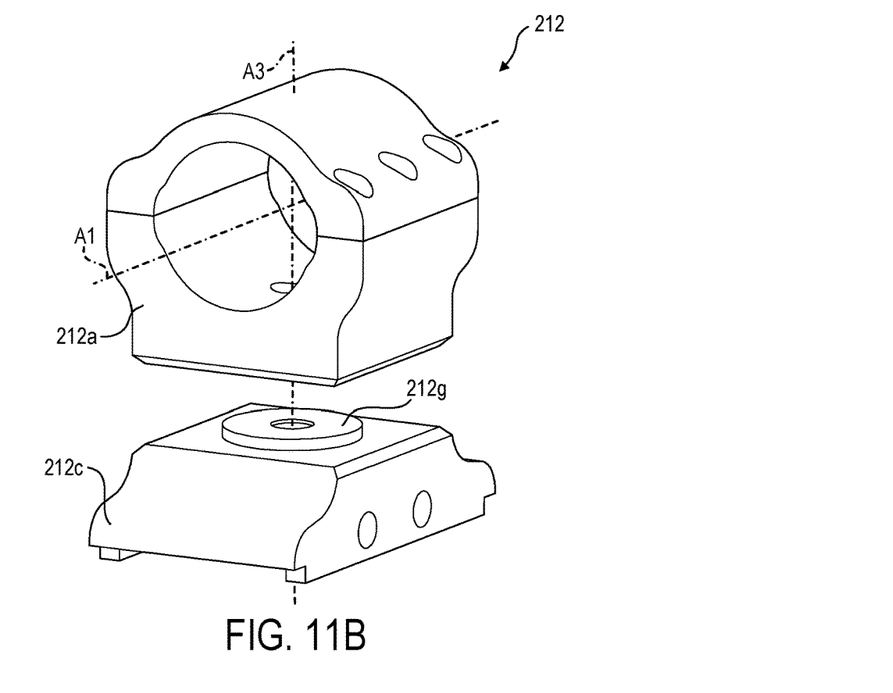

Referring now to FIGS. 11A-11B, the base 212 of the third embodiment is described in more detail. To allow the attachment portion 212a to be rotatable relative the base mounting portion 212c of the base 212, the attachment portion 212a of the base 212 is preferentially formed separately from the base mounting portion 212c of the base 212. The attachment portion 212a and the base mounting portion 212c may be configured to be rotatable coupled to each other using, for example, with an annular protrusion 212g on either the attachment portion 212a or the base mounting portion 212c configured to fit within a recess 212h in either the attachment portion 212a or the base mounting portion 212c. The embodiment shown here has an annular protrusion 212g on the base mounting portion 212c and an annular recess 212h in the attachment portion 212a of the base 212. Additionally, the attachment portion 212a and the base mounting portion 212c of the third embodiment may be secured together with, for example, a screw. The screw may also be tightened sufficiently to inhibit further rotation of the attachment portion 212a relative to the base mounting portion 212c once a suitable orientation has been determined. Similar to the other embodiments, the base mounting portion 212c is configured to mount the base 212 to the bracket body 214, and the attachment portion 212a is configured to attach an object 218 to the base 212. By configuring the base 212 such that the attachment portion 212a may be rotated relative to the base mounting portion 212c, the bracket body 214 and the object 218 attached to the bracket body 214 may be rotated relative to a structure 220 to which the base 212 is attached. This allows the position of the object 218 to be adjustable in order to position it for easy access and storage. For all other aspects of this embodiment of the mounting assembly 210, the configuration reflects the primary embodiment of the present disclosure.

While specific embodiments of mounting assembly have been described in detail, the particular arrangements disclosed are meant to be illustrative only and not limiting. The features of the various embodiments described above, as well as modifications thereof, may be variously combined without departing from the scope of this disclosure.

The invention claimed is:

1. A mounting system, comprising:
a base with an attachment portion, the attachment portion having an attachment surface extending along a first axis and the base having one or more base keyholes extending along a second axis, the attachment portion being configured to attach the base to a structure, the base defining two notches;
a bracket body with an object receiving portion configured to receive an object on the bracket body, the bracket body including a protuberance extending along a third axis in a direction away from the object receiving portion, the protuberance having one or more bracket body keyholes along the second axis, the bracket body also including two lips at distal ends of the bracket body, wherein the base includes a distal-most end along the third axis and spaced from the attachment portion, each of the two notches extends along the second axis an entire length of the base measured at the distal-most end of the base and along the second axis, each of the two lips extends along the third axis in the direction away from the object receiving portion, each of the two lips extends along the second axis the entire length of the base measured at the distal-most end of the base and along the second axis, each of the two lips is configured to fit into a respective one of the two notches along the second axis, and each of the two lips also extends along the first axis; and
a key with a handle and one or more pins sized to be inserted in the one or more bracket body keyholes and the one or more base keyholes such that movement of the bracket body along the third axis is prevented; wherein
the protuberance couples with the base such that movement of the bracket body along the second axis is prevented and the two lips at the distal ends of the bracket body couple with the base such that movement of the bracket body along the first axis is prevented,
the one or more base keyholes are aligned with the one or more bracket body keyholes with the one or more pins of the key disposed therein, and the one or more pins of the key are configured to inhibit rotation of the handle of the key; and
upon removal of the key from the mounting system, the base and the bracket body are configured to quickly uncouple.

2. The mounting system of claim 1, wherein
the second axis is substantially orthogonal to the first axis, and the third axis is substantially orthogonal to both the first axis and the second axis.

3. The mounting system of claim 1, wherein
the key is configured to be retained within the mounting system via detents.

4. The mounting system of claim 1, wherein
the one or more pins of the key include two pins.

5. The mounting system of claim 1, wherein
the key is adapted to be inserted into the one or more base keyholes and the one or more bracket body keyholes from either of two sides of the mounting system.

6. The mounting system of claim 1, wherein
the handle of the key has a bore, and the bore of the handle is substantially orthogonal to the second axis.

7. The mounting system of claim 6, wherein
the handle of the key has a hand grip with finger grooves formed within the bore.

8. The mounting system of claim 1, further comprising:
one or more attachment rings; and
a plurality of recesses defined by the object receiving portion of the bracket body and configured to positionally retain the one or more attachment rings extending therethrough, wherein
the one or more attachment rings are formed separately from the bracket body and configured to secure the object to the bracket body.

9. The mounting system of claim 8, wherein
the one or more attachment rings include one or more hose clamps.

10. The mounting system of claim 1, further comprising:
one or more attachment rings; and
a plurality of recesses defined by the object receiving portion of the bracket body and configured to positionally retain the one or more attachment rings, wherein
the one or more attachment rings are configured to attach to the bracket body and to secure the object to the bracket body.

11. The mounting system of claim 1, wherein
the attachment surface of the base defines a longitudinal bore extending along the first axis; and
the longitudinal bore has an oval shape or a polygonal shape.

12. The mounting system of claim 11, wherein
the base comprises at least two base sections formed separately; and
a relief is formed in the longitudinal bore along seams where the at least two base sections meet each other, wherein a diameter of the longitudinal bore is greater at the relief than at a location adjacent to the relief.

13. The mounting system of claim 1, wherein
a shape of the attachment surface of the base is formed to conform to, at least in part, a shape of the structure.

14. The mounting system of claim 1, wherein
the base comprises a base mounting portion formed separately from the attachment portion; and
the base mounting portion is rotatable about the third axis, and the third axis is substantially orthogonal to both the first axis and the second axis.

15. The mounting system of claim 1, wherein
the base, the bracket body and the key are formed of aluminum.

16. A mounting system, comprising:
a base with an attachment portion, the attachment portion having an attachment surface extending along a first axis, the base having one or more base keyholes extending along a second axis, and the attachment portion being configured to attach the base to a structure, the base defining two notches;
a bracket body with an object receiving portion configured to receive an object on the bracket body, the bracket body including a protuberance extending along a third axis in a direction away from the object receiving portion, the protuberance having one or more bracket body keyholes along the second axis, the bracket body also including two lips at distal ends of the bracket body, wherein the base includes a distal-most end along the third axis and spaced from the attachment portion, each of the two notches extends along the second axis an entire length of the base measured at the distal-most end of the base and along the second axis, each of the two lips extends along the third axis in the direction away from the object receiving portion, each of the two lips extends along the second axis the entire length of the base measured at the distal-most end of the base and along the second axis, each of the two lips is configured to fit into a respective one of the two notches along the second axis, and each of the two lips also extends along the first axis; and a key with a handle and one or more pins sized to be inserted in the one or more bracket body keyholes and the one or more base keyholes such that movement of the bracket body along the third axis is prevented, the handle of the key having a hand grip with finger grooves formed within a bore of the handle;

wherein the protuberance couples with the base such that movement of the bracket body along the second axis is prevented and the two lips at the distal ends of the bracket body couple with the base such that movement of the bracket body along the first axis is prevented, wherein the one or more base keyholes are aligned with the one or more bracket body keyholes with the one or more pins of the key disposed therein, and the one or more pins of the key are configured to inhibit rotation of the handle of the key, wherein the key is adapted to be inserted into the one or more base keyholes and the one or more bracket body keyholes from either of two sides of the mounting system, and wherein, upon removal of the key from the mounting system, the base and the bracket body are configured to quickly uncouple.

* * * * *

UNITED STATES PATENT AND TRADEMARK OFFICE
CERTIFICATE OF CORRECTION

PATENT NO. : 10,376,723 B2
APPLICATION NO. : 15/220280
DATED : August 13, 2019
INVENTOR(S) : Matthew R. Schultz Page 1 of 1

It is certified that error appears in the above-identified patent and that said Letters Patent is hereby corrected as shown below:

On the Title Page

In item (73), Assignee data, delete "Oregon, OR" and insert --Oregon City, OR--.

Signed and Sealed this
Eighth Day of October, 2019

Andrei Iancu
*Director of the United States Patent and Trademark Office*